Patented Jan. 8, 1935

1,987,266

UNITED STATES PATENT OFFICE 1,987,266

2-ALKYLAMINOBENZENE-1-CARBOXYLIC ACID-4-SULPHONIC ACIDS

Anton Ossenbeck, Cologne-Mulheim, and Ernst Tietze, Cologne-on-the-Rhine, Germany, assignors to General Aniline Works, Inc., New York, N. Y., a corporation of Delaware No Drawing. Original application August 10, 1932, Serial No. 628,272. Divided and this application June 29, 1933, Serial No. 678,314. In Germany January 22, 1932

3 Claims. (Cl. 260—109)

The present invention relates to 2-alkylaminobenzene-1-carboxylic acid-4-sulphonic acids. More particularly it relates to compounds which may be represented by the general formula:

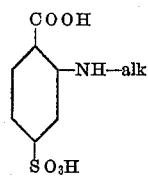

wherein "alk" stands for an alkyl group of at least three carbon atoms.

According to our invention these products are prepared by causing a suitable primary aliphatic amine, such as propylamine, butylamine, isobutylamine and the like, to act upon a 2-halogenbenzene-1-carboxylic acid-4-sulphonic acid or an alkali metal salt thereof in aqueous solution and at elevated temperature.

The temperature used may be varied within the widest limits, for example, the process may be carried out between about 40° C. and about 200° C.; generally, however, we are working at temperatures between about 75° C. and about 140° C., and favorably with excess alkylamine.

From the reaction mixture the 2-alkylaminobenzene-1-carboxylic acid-4-sulphonic acids are isolated in the usual manner, for example, by rendering the reaction mass alkaline to caustic soda, distilling off the excess alkylamine and precipitating the 2-alkylaminobenzene-1-carboxylic acid-4-sulphonic acids by the addition of an acid.

The 2-alkylaminobenzene-1-carboxylic acid-4-sulphonic acids are generally colorless crystalline substances, difficultly soluble in water, in form of their alkali metal salts easily soluble in water; they are valuable intermediate products for the manufacture of dyestuffs and synthetic drugs.

If desired, our new process may be carried out with the addition of a suitable catalyst, such as copper or a copper salt, for example cuprous chloride.

The invention is illustrated by the following examples, without being limited thereto:

*Example.*—The neutral solution of the sodium salt of 50 parts by weight of 2-chlorobenzene-1-carboxylic acid-4-sulphonic acid in 100 parts of water is heated with 45 parts by weight of 100% n-butylamine to 80° C. for 12 hours under reflux. The reaction mixture is worked up by rendering alkaline by means of caustic soda and boiling until n-butylamine no longer escapes. The solution is then evaporated until crystallization occurs and the 2-n-butylaminobenzene-1-carboxylic acid-4-sulphonic acid is isolated in the form of the acid sodium salt. The yield is almost equal to the theoretical.

When the n-butylamine is replaced by equivalent quantities of n-propylamine, isobutylamine or isoamylamine there are produced in a perfectly analogous manner the corresponding salts of 2-n-propylaminobenzene-, isobutylaminobenzene- or isoamylaminobenzene-1-carboxylic acid-4-sulphonic acid.

This application is a division of application Ser. No. 628,272, filed August 10, 1932, now Patent No. 1,960,644 of May 29, 1934.

We claim:

1. 2-alkylaminobenzene-1-carboxylic acid-4-sulphonic acids of the formula:

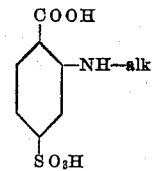

wherein "alk" stands for alkyl containing at least 3 carbon atoms, being colorless, crystalline substances, soluble in water and being valuable intermediate products for the manufacture of dyestuffs and synthetic drugs.

2. 2-alkylaminobenzene-1-carboxylic acid-4-sulphonic acids of the formula:

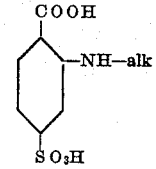

wherein "alk" stands for alkyl containing 3 to 5 carbon atoms, being colorless, crystalline substances, soluble in water and being valuable intermediate products for the manufacture of dyestuffs and synthetic drugs.

3. 2-n-butylaminobenzene-1-carboxylic acid-4-sulphonic acid, being a colorless, crystalline substance, soluble in water and being a valuable intermediate product for the manufacture of dyestuffs and synthetic drugs.

ANTON OSSENBECK.
ERNST TIETZE.